US00RE47402E

(19) United States
(12) Reissued Patent
Takacs et al.

(10) Patent Number: US RE47,402 E
(45) Date of Reissued Patent: May 21, 2019

(54) LED LAMP SYSTEM

(71) Applicant: Energy Focus, Inc., Solon, OH (US)

(72) Inventors: Laszlo A. Takacs, Lakewood, OH (US); Roger F. Buelow, Pepper Pike, OH (US); Tomislav Kralj, Chardon, OH (US)

(73) Assignee: ENERGY FOCUS, INC., Solon, OH (US)

(21) Appl. No.: 15/827,385

(22) Filed: Nov. 30, 2017

Related U.S. Patent Documents

Reissue of:
(64) Patent No.: 9,204,504
Issued: Dec. 1, 2015
Appl. No.: 13/605,670
Filed: Sep. 17, 2012

(51) Int. Cl.
*H05B 37/02* (2006.01)
*H05B 33/08* (2006.01)

(52) U.S. Cl.
CPC ..... *H05B 33/0815* (2013.01); *H05B 33/0845* (2013.01); *Y02B 20/347* (2013.01)

(58) Field of Classification Search
CPC ..... H05B 33/0815; H05B 33/0845
See application file for complete search history.

(56) References Cited

U.S. PATENT DOCUMENTS

| | | | |
|---|---|---|---|
| 4,734,650 | A | 3/1988 | Alley et al. |
| 5,640,061 | A | 6/1997 | Bornhorst et al. |
| 5,925,990 | A | 7/1999 | Crouse et al. |
| 6,031,338 | A | 2/2000 | Yoon et al. |
| 6,091,614 | A | 7/2000 | Malenfant |
| 6,150,771 | A | 11/2000 | Perry |
| 6,369,525 | B1 | 4/2002 | Chang et al. |
| 6,504,321 | B2 | 1/2003 | Giannopoulos et al. |
| 6,528,954 | B1 | 3/2003 | Lys et al. |
| 6,577,512 | B2 | 6/2003 | Tripathi et al. |
| 6,586,890 | B2 | 7/2003 | Min et al. |
| 6,608,450 | B2 | 8/2003 | Lestician |
| 6,674,248 | B2 | 1/2004 | Newman, Jr. et al. |
| 6,791,283 | B2 | 9/2004 | Bowman et al. |
| 7,049,761 | B2 | 5/2006 | Timmermans et al. |
| 7,307,391 | B2 | 12/2007 | Shan |

(Continued)

FOREIGN PATENT DOCUMENTS

CA 2651224 A1 8/2007

OTHER PUBLICATIONS

S9086-K9-STM-010 (Revision 3) Naval Ships' Technical Manual, Chapter 330, Lighting (dated Mar. 1, 2005), 98 pages.

(Continued)

*Primary Examiner* — Angela M Lie
(74) *Attorney, Agent, or Firm* — Rankin, Hill & Clark LLP

(57) ABSTRACT

Disclosed is an LED lamp system designed to fit into a fluorescent lamp fixture and to utilize a fluorescent lamp power supply contained in the fixture and receiving power from AC mains. The LED lamp system includes an LED driver which comprises a power factor corrected driver circuit for achieving a power factor of at least about 0.8. The LED driver further comprises a current control circuit, responsive to the presence of a three-wire magnetic ballast in the fluorescent lamp power supply, for increasing the LED operating current above the nominal rated LED operating current and to a level sufficient to achieve power factor of the LED driver of at least about 0.8.

10 Claims, 5 Drawing Sheets

(56) References Cited

U.S. PATENT DOCUMENTS

| | | | | |
|---|---|---|---|---|
| 7,333,027 | B2 | 2/2008 | Bourgault | |
| 7,507,001 | B2 | 3/2009 | Kit | |
| 7,528,551 | B2 | 5/2009 | Ball | |
| 7,542,257 | B2 | 6/2009 | McCormick et al. | |
| 7,546,167 | B2 | 6/2009 | Walters et al. | |
| 7,557,524 | B2 | 7/2009 | Chevalier et al. | |
| 7,597,456 | B2 | 10/2009 | Catalano et al. | |
| 7,600,882 | B1 | 10/2009 | Morejon et al. | |
| 7,626,342 | B2 | 12/2009 | Sun et al. | |
| 7,635,957 | B2 | 12/2009 | Tripathi et al. | |
| 7,667,414 | B2 | 2/2010 | Fujino et al. | |
| 7,759,881 | B1 | 7/2010 | Melanson | |
| 7,772,782 | B2 | 8/2010 | Chu et al. | |
| 7,777,430 | B2 | 8/2010 | Catalano et al. | |
| 7,781,982 | B2 | 8/2010 | Tatsumi | |
| 7,795,820 | B2 | 9/2010 | Housman | |
| 7,800,313 | B1 | 9/2010 | Allen et al. | |
| 7,804,256 | B2 | 9/2010 | Melanson | |
| 7,852,017 | B1 | 12/2010 | Melanson | |
| 7,911,149 | B2 | 3/2011 | Schaible et al. | |
| 7,932,679 | B2 | 4/2011 | Ball | |
| 7,944,153 | B2 | 5/2011 | Greenfeld | |
| 7,946,730 | B2 | 5/2011 | Catalano et al. | |
| 7,952,294 | B2 | 5/2011 | Shteynberg et al. | |
| 8,018,170 | B2 | 9/2011 | Chen et al. | |
| 8,033,682 | B2 | 10/2011 | Catalano et al. | |
| 8,044,600 | B2 | 10/2011 | Yan et al. | |
| 8,054,008 | B2 | 11/2011 | Kimura | |
| 8,093,837 | B2 | 1/2012 | Goriki et al. | |
| 8,115,411 | B2 | 2/2012 | Shan | |
| 8,115,418 | B2 | 2/2012 | Haubmann | |
| 8,120,282 | B2 | 2/2012 | Yamauchi | |
| 8,134,303 | B2 | 3/2012 | Lys | |
| 8,154,221 | B2 | 4/2012 | Godbole et al. | |
| 8,174,204 | B2 | 5/2012 | Melanson | |
| 8,193,717 | B2 | 6/2012 | Leiderman | |
| 8,664,880 | B2 * | 3/2014 | Ivey et al. | H05B 33/0815 315/224 |
| 8,791,650 | B2 | 7/2014 | Shan | |
| 2004/0113567 | A1 | 6/2004 | Yamauchi et al. | |
| 2005/0219872 | A1 | 10/2005 | Lys | |
| 2007/0103949 | A1 | 5/2007 | Tsuruya | |
| 2007/0182347 | A1 | 8/2007 | Shteynberg et al. | |
| 2007/0229084 | A1 | 10/2007 | Cho et al. | |
| 2008/0231201 | A1 | 9/2008 | Higley et al. | |
| 2008/0290814 | A1 | 11/2008 | Leong et al. | |
| 2008/0309257 | A1 | 12/2008 | Hickey | |
| 2008/0315780 | A1 | 12/2008 | Lee et al. | |
| 2009/0141519 | A1 | 6/2009 | Hong et al. | |
| 2009/0146580 | A1 | 6/2009 | Van Casteren et al. | |
| 2009/0167190 | A1 | 7/2009 | Hickey | |
| 2009/0200960 | A1 | 8/2009 | King | |
| 2009/0309501 | A1 | 12/2009 | Catalano et al. | |
| 2010/0181925 | A1 | 7/2010 | Ivey et al. | |
| 2010/0207536 | A1 * | 8/2010 | Burdalski et al. | H05B 33/0815 315/224 |
| 2011/0012530 | A1 | 1/2011 | Zheng et al. | |
| 2011/0043120 | A1 | 2/2011 | Panagotacos et al. | |
| 2011/0043127 | A1 | 2/2011 | Yamasaki | |
| 2011/0043136 | A1 | 2/2011 | Radermacher | |
| 2011/0080103 | A1 | 4/2011 | Reed et al. | |
| 2011/0121756 | A1 | 5/2011 | Thomas et al. | |
| 2011/0127913 | A1 | 6/2011 | Harmgardt et al. | |
| 2011/0140630 | A1 | 6/2011 | Doudousakis et al. | |
| 2011/0210861 | A1 | 9/2011 | Winton et al. | |
| 2011/0260647 | A1 | 10/2011 | Catalano et al. | |
| 2011/0266969 | A1 | 11/2011 | Ludorf | |
| 2011/0273097 | A1 | 11/2011 | Kuo | |
| 2011/0279044 | A1 | 11/2011 | Maiw | |
| 2011/0291585 | A1 | 12/2011 | Foo | |
| 2012/0025729 | A1 | 2/2012 | Melanson et al. | |
| 2012/0032608 | A1 | 2/2012 | Nerone | |
| 2012/0043903 | A1 | 2/2012 | Quayle et al. | |
| 2013/0320869 | A1 * | 12/2013 | Jans et al. | H05B 33/0803 315/186 |
| 2013/0342119 | A1 * | 12/2013 | Malboeuf Joset et al. | H05B 33/0809 315/193 |

OTHER PUBLICATIONS

Fixtures, Lighting; Ballast, for One 20-Watt T-12 Fluorescent Lamp, Detail Specification Sheet MIL-DTL-16377/72, Base Document (dated Aug. 2, 1996), 5 pages.

* cited by examiner

LED LAMP SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to an LED lamp system designed to fit into a fluorescent lamp fixture. More particularly, the invention relates to an LED driver for the LED lamp system that results in a power factor presented to AC mains of at least about 0.8 when the fluorescent lamp fixture includes a three-wire magnetic ballast.

BACKGROUND OF THE INVENTION

LED lamps are being developed by various companies for replacing fluorescent lamps in fluorescent lamp fixtures ("FLFs"). In many cases, the fluorescent lamp ballasts are removed or disconnected from a FLF, and additional wiring is provided to drive (or power) the LED lamps. In some cases, the LED lamps can be made to accept the electrical power input from a specific type of existing fluorescent tube ballast in the FLF. An economical option for fluorescent lamp replacement by an LED lamp is to leave the existing fluorescent lamp ballast in the FLF and to utilize such ballast for powering the LED lamps without any rewiring of the FLF.

As discovered by the present inventor, current LED lamp drive circuitry encounters a problem with three-wire magnetic ballasts used in fluorescent lamp fixtures ("FLFs"). Three-wire magnetic ballasts exhibit a high power factor when powering fluorescent lamps, but when powering LED lamps with a power factor corrected LED driver, the present inventor discovered that power factor substantially decreases to about 0.63, for instance. As is known, the power factor of an electrical circuit is the ratio of the real power flowing to the circuit to the apparent power in the circuit.

Accordingly, it would be desirable to provide an LED lamp system designed to fit into a fluorescent lamp fixture and which can utilize an existing three-wire magnetic fluorescent lamp ballast already present in the fluorescent lamp fixture, while presenting a power factor to AC mains of at least about 0.8.

BRIEF SUMMARY OF THE INVENTION

In accordance with a preferred aspect of the invention, an LED lamp system is provided. The LED lamp system is designed to fit into a fluorescent lamp fixture and to utilize a fluorescent lamp power supply contained in the fixture and receiving power from AC mains. The LED lamp system includes an LED driver which comprises a power factor corrected driver circuit for presenting a power factor to the AC mains of at least about 0.8. The LED driver further comprises a current control circuit, responsive to the presence of a three-wire magnetic ballast in the fluorescent lamp power supply, for increasing the LED operating current above the nominal rated LED operating current and to a level sufficient to present a power factor to the AC mains of at least about 0.9. Preferably, the presence of the three-wire magnetic ballast is automatically detected by the LED lamp system.

Beneficially, the foregoing LED lamp system can utilize an existing three-wire magnetic fluorescent lamp ballast already present in a fluorescent lamp fixture, while presenting a power factor to AC mains of at least about 0.8.

BRIEF DESCRIPTION OF THE DRAWINGS

Further features and advantages of the invention will become apparent from reading the following detailed description in conjunction with the following drawings, in which like reference numbers refer to like parts.

DETAILED DESCRIPTION OF THE PREFERRED EMBODIMENT

Figure 1:
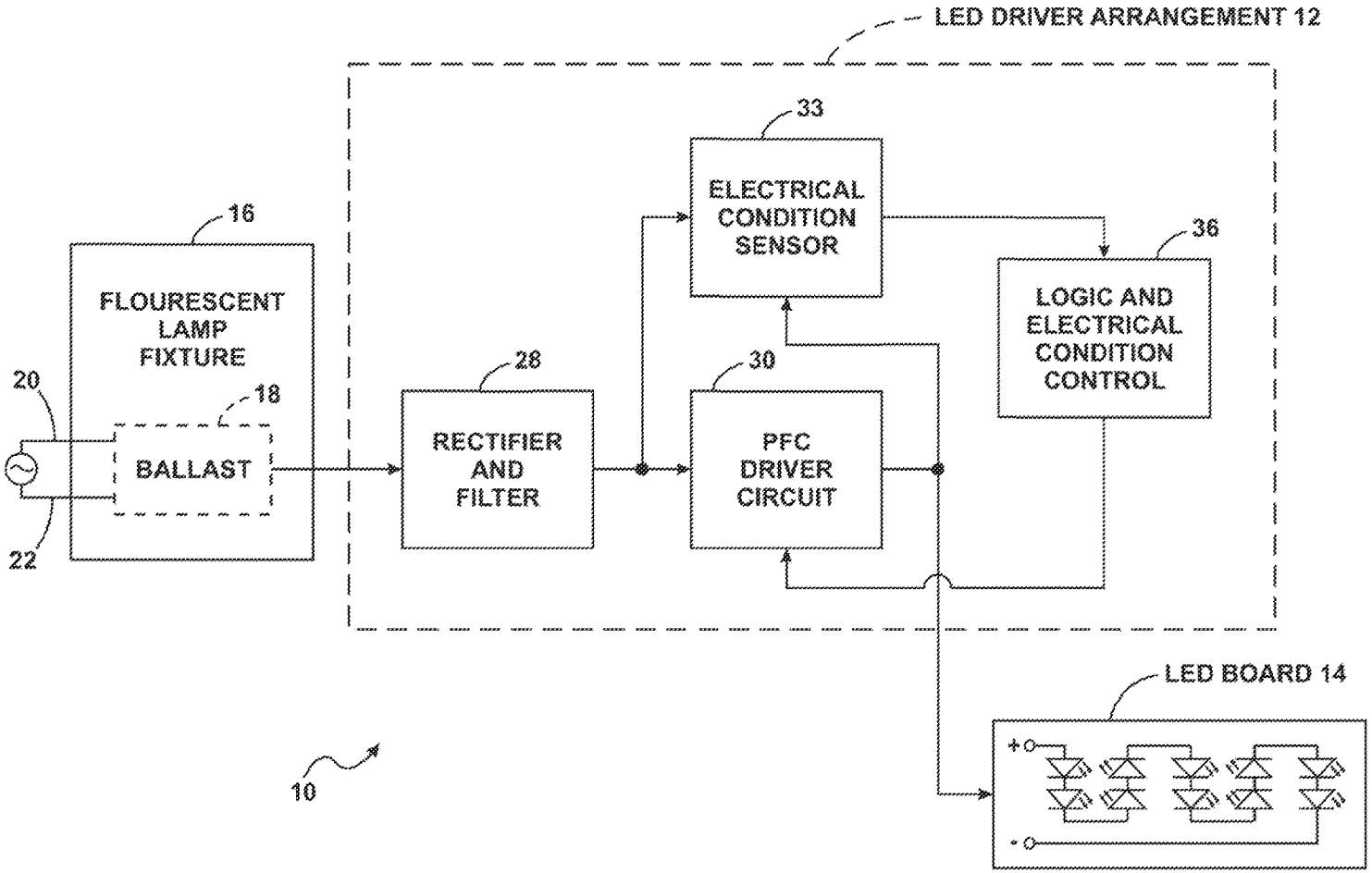
FIG. 1 is a schematic diagram, partly in block form, of an LED lamp system using a lamp driver in accordance with the present invention.

FIG. 1 shows an LED lamp system 10 including an LED driver arrangement 12 and an LED board 14. The LED board 14 may be a printed-circuit board on which one or more LEDs are mounted. LED lamp system 10 is designed to fit into a fluorescent lamp fixture 16, which may contain in its power supply for a fluorescent lamp a ballast 18 powered by AC mains 20 and 22.

LED lamp driver arrangement 12 includes a suitably conventional full-wave rectifier and filter 28 for receiving power from fluorescent lamp ballast 18. A Power Factor Corrected (PFC) driver circuit 30 is used to present to the AC mains 20 and 22 a power factor of at least about 0.8, 0.9 and 0.95, with 1.0 being a perfect power factor. More preferably, such power factor is at least 0.99. As is known, the power factor of an electrical circuit is the ratio of the real power flowing to the circuit to the apparent power in the circuit. A suitable PFC driver circuit 30 may be a Model L6562AT chip sold by STMicroelectronics whose headquarters is in Geneva, Switzerland. Other suitable PFC circuits include a Model MC33368 chip sold by Freescale Semiconductor Inc. of Austin, Tex. U.S.A.

Figure 2:
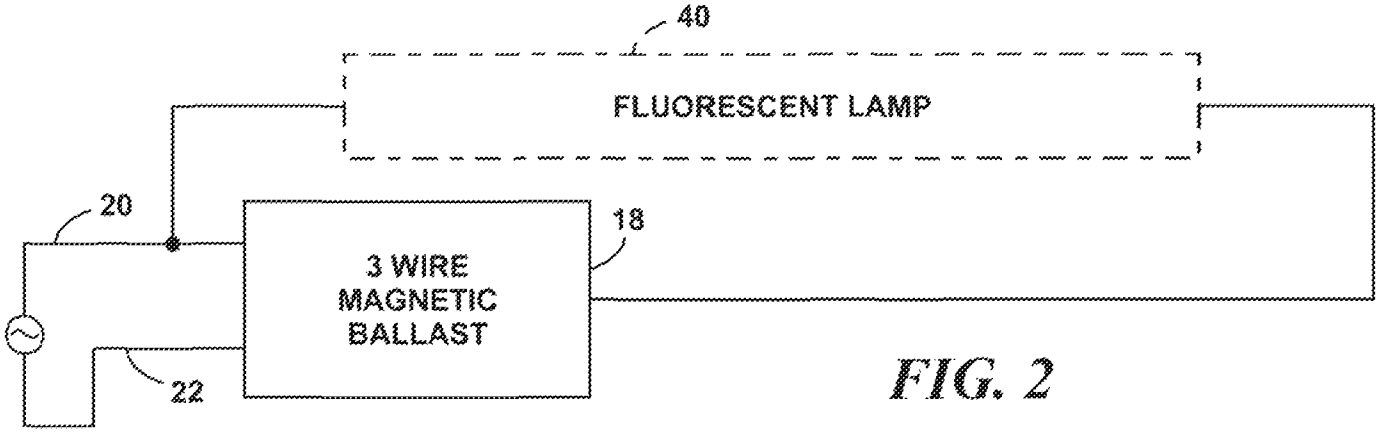
FIG. 2 is a schematic diagram, partly in block form, of a three-wire magnetic ballast connected to a fluorescent lamp.
Figure 3:
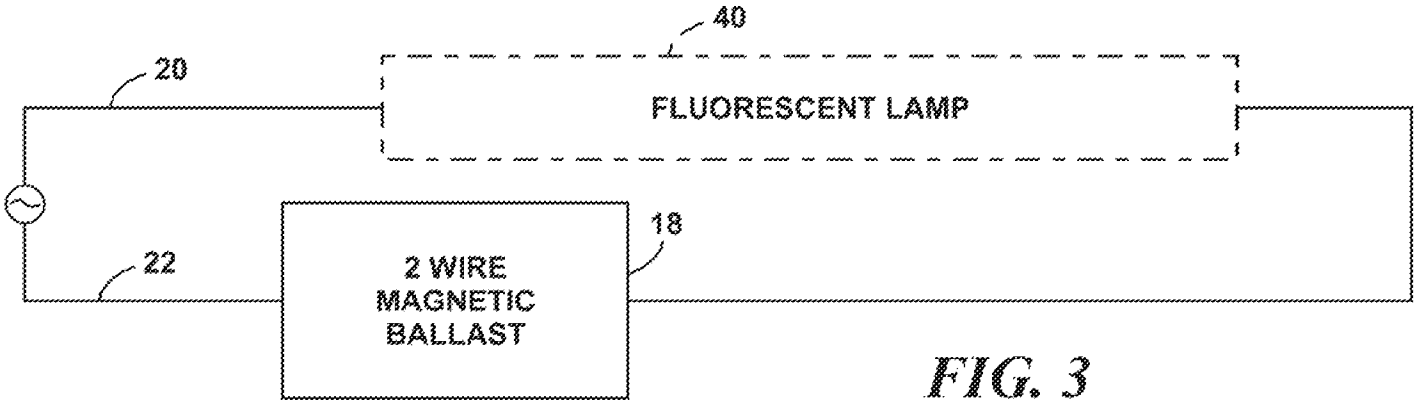
FIG. 3 is a schematic diagram, partly in block form, of a two-wire magnetic ballast connected to a fluorescent lamp.

In a preferred embodiment, an electrical condition sensor 33 monitors input voltage and current from the rectifier and filter 28 and also output current supplied to the one or more LEDs on the LED board 14. A logic and electrical condition control circuit 36, typically carried out with a microprocessor, determines whether the fluorescent lamp fixture 16 contains a ballast 18 and whether such ballast 18 is a three-wire magnetic ballast, such as shown in FIG. 2, as opposed, for instance, to a two-wire magnetic ballast 18 as shown in FIG. 3. In FIGS. 2 and 3, a fluorescent lamp is indicated in phantom at 40, and the other reference numbers correspond to the same reference numbers in FIG. 1.

In response to the electrical condition sensor 33, the logic and electrical condition control circuit 36 sets an appropriate level of current for the one or more LEDs on the LED board 14, and also may adjust the input voltage and current to the LED driver 16 so as to properly interact with the fluorescent lamp ballast 18.

In the event that a determination is made that the fluorescent lamp ballast 18 is a three-wire magnetic ballast, which may be done manually or more preferably via the logic and electrical condition control circuit 36, such circuit 36 will increase the current supplied to the LED board 14 sufficiently above the nominal current rating of the one or more LEDs on the board 14 to assure that the power factor presented to the AC mains 20 and 22 can be maintained at least about 0.8. This is in accordance with experimentation and discovery by the present inventor, which found that, despite using a PFC driver circuit 30 that normally results in a power factor of at least about 0.99 with a two-wire magnetic ballast, for example, considerably lower power factors, such as 0.83, were obtained when the fluorescent lamp fixture 16 contained a three-wire magnetic ballast and nominal rated current was supplied to the one or more LEDs on the LED board 14. Ironically, three-wire magnetic ballasts, when powering fluorescent lamps, typically achieved, without a separate power factor correction circuit, a power factor that could typically reach in excess of about 0.97. Beneficially, when the current level is increased to the LED board 14 to no more than about 318 ma, the efficiency of electricity-to-lumen conversion of the LEDs on the LED board 14 does not decrease because the lumen output of the LED board increases.

Figure 4:
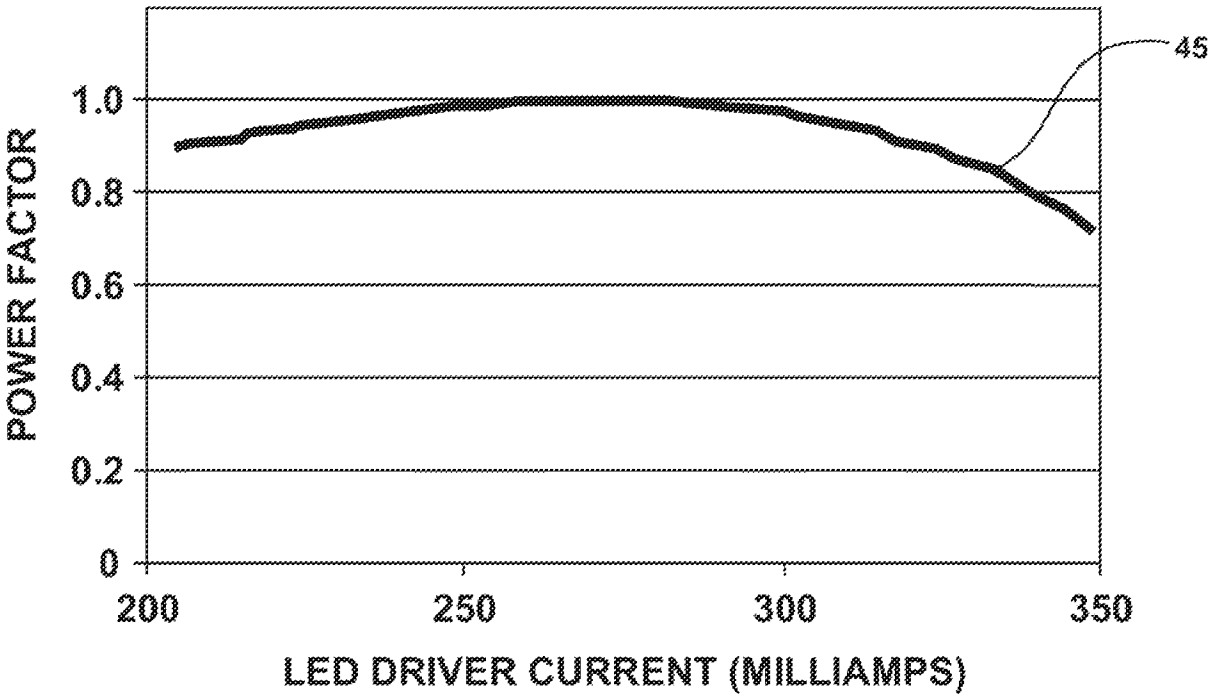
FIG. 4 is a graph of power factor versus current supplied to an LED driver arrangement that is used with a fluorescent lamp containing a three-wire magnetic ballast.

In order to determine an appropriate increase in current supplied to the one or more LEDs on LED board 14, FIG. 4 shows a typical graph 45 of power factor presented to AC mains versus current supplied to LED driver arrangement 12 of FIG. 1. The current supplied to the one or more LEDs on LED board 14 is typically about 95 percent of the current supplied to the LED driver arrangement 12, which uses some current for logic functions, etc.

As can be seen in FIG. 4, a current level of about 270 milliamps (ma) beneficially achieves a very high power factor of, for instance, 0.99. Such an increased level of current has been found to accommodate various three-wire magnetic ballasts, which differ from each other due to manufacturing tolerances, for instance. However, lesser current levels can attain a very high power factor, depending on the specific three-wire magnetic ballast used. If a more modest power factor of about, for instance, 0.95, 0.9 or 0.8 for the LED driver is tolerable, then the elevated current level can be less than 270 ma, for instance.

For high power factor, it is preferred that the current supplied to the LED driver arrangement 12 is greater than 200 milliamps, or, stated differently, that such current is within about five percent of 270 ma.

It would be a matter of routine skill, based on the present specification, for a person of ordinary skill in the art to prepare a graph similar to graph 45 of FIG. 4 for determining an optimum level of current supplied to a specific LED driver arrangement 12 (FIG. 1) for presenting to AC mains a power factor of at least about 0.8, or other values as mentioned in this specification.

Figure 5:
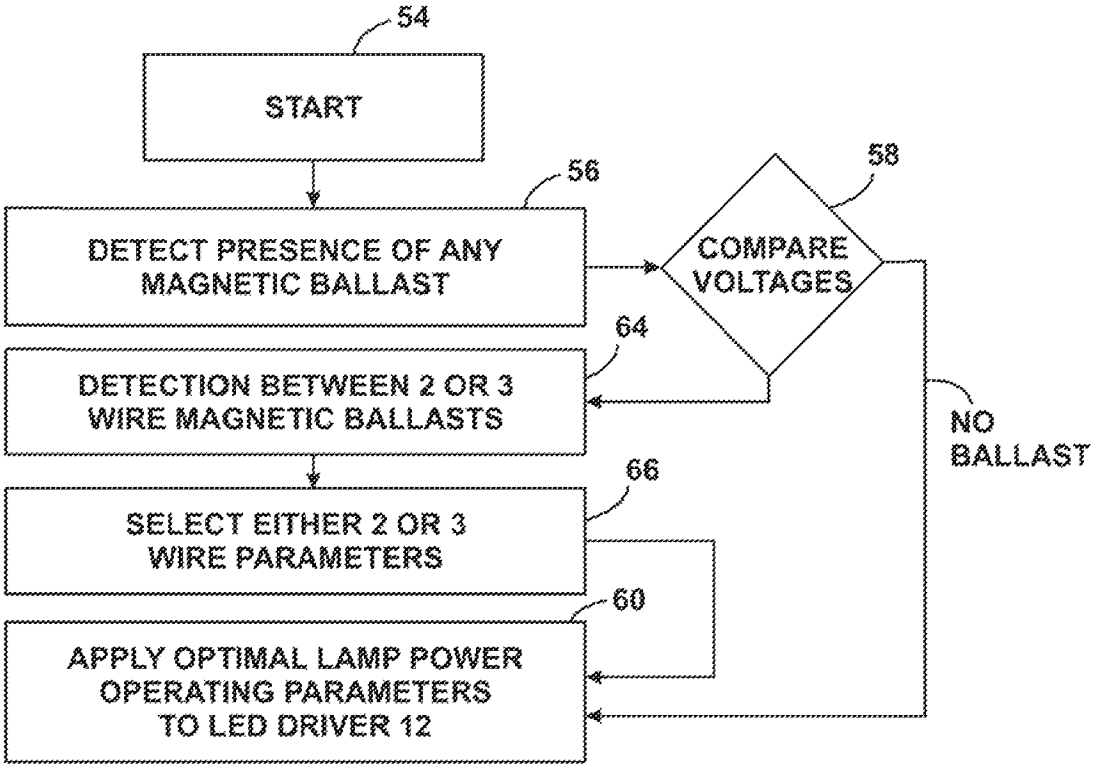
FIG. 5 is a flow chart of a typical sequence of logic analysis for realizing benefits of the present invention.

FIG. 5 shows a flow chart of typical logic analysis for realizing benefits of a preferred, automated aspect of the present invention. The start of the logic analysis is step 54, which is usually carried out by placing LED lamp system 10 (FIG. 1) into fluorescent lamp fixture 16 (FIG. 1). This leads to step 56, which is the detection of any magnetic ballast in the fluorescent lamp fixture ("FLF") 16. This may be accomplished by holding the input current to LED driver arrangement 12 at a decreased level, and measuring and saving the value of input voltage to LED driver arrangement 12. This is followed by holding the input current to LED driver arrangement 12 at nominal input current for a no-wire (no ballast) or two-wire magnetic ballast, for example, and comparing the existing input voltage to the LED driver arrangement 12 to the saved input voltage value, according to step 58. If the difference between the two values is approximately zero, a determination is made that no magnetic ballast is present in FLF 16 (FIG. 1), as indicated by the notation "NO BALLAST" in the output of step 58, and the ensuing step 60 instructs the LED driver arrangement 12 to apply optimal lamp power operating parameters for the condition wherein the FLF 16 lacks any magnetic ballast.

If the mentioned comparison of voltages in connection with the voltage-comparison step 58 indicates that the difference in voltages is greater than about five volts, for instance, a determination is made that FLF 16 contains a magnetic ballast. The flow chart then proceeds to step 64, wherein detection is made between a two-wire magnetic ballast and a three-wire magnetic ballast in FLF 16. Based on the detection between two-wire and three-wire magnetic ballasts of step 64, which is further detailed below, a selection of either a two-wire magnetic ballast or a three-wire magnetic ballast in made in step 66; such selection is carried out by the logic and electrical condition circuit 36 of FIG. 1. The flow chart then reaches step 60, wherein the optimal lamp power operating parameters are chosen and applied to LED driver arrangement 12. As mentioned above, in the case of a three-wire magnetic ballast being determined as the fluorescent lamp ballast 18, the current supplied to the one or more LEDs on the LED board 14 (FIG. 1) is increased sufficiently above nominal rated LED current so that the power factor presented to AC mains 20 and 22 (FIG. 1) is at least about 0.8.

Figure 6:
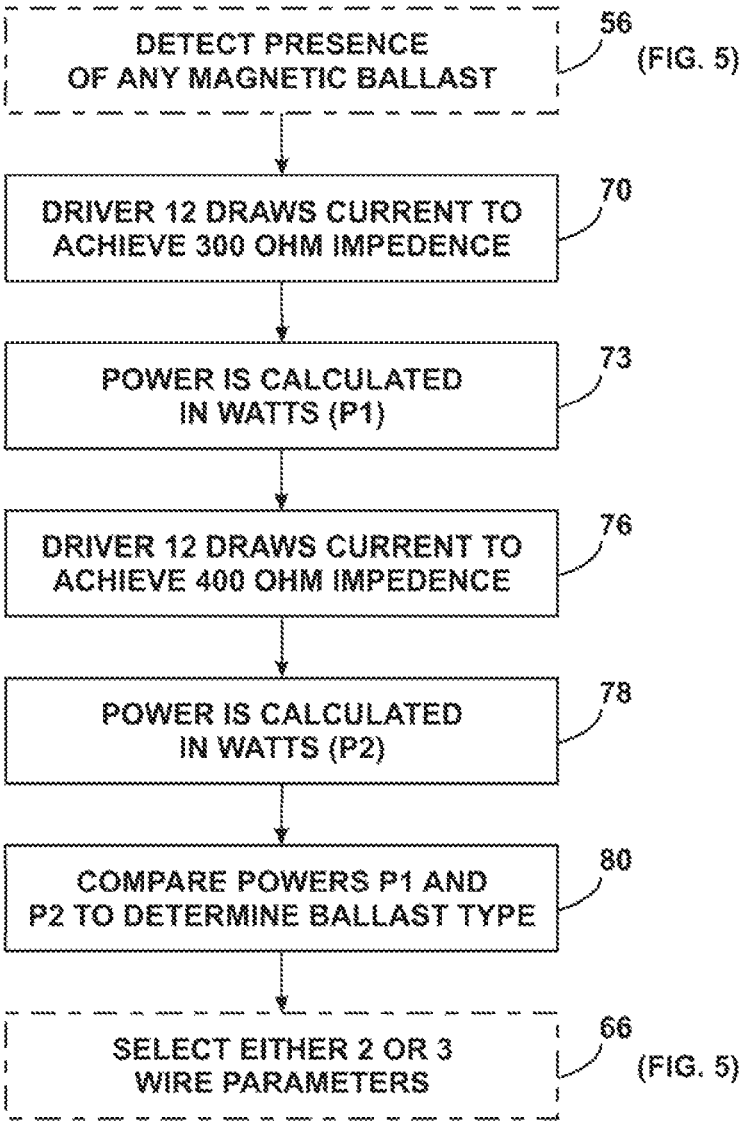
FIG. 6 is a flow chart of a preferred way to detect between two and three-wire magnetic ballasts in a fluorescent lamp fixture.

FIG. 6 shows a preferred way to carry out step 64 of FIG. 5, that is, of detecting whether the FLF 16 of FIG. 1 contains a two-wire or a three-wire magnetic ballast. FIG. 5 repeats, in phantom, step 56 from FIG. 5 of detecting the presence of any magnetic ballast. According to following step 70, driver arrangement 12 draws current to achieve an impedance of, for instance, 300 ohms. According to step 73, the power consumed by the LED driver arrangement 12 is then calculated in watts, as P1, for instance. According to step 76, the LED driver arrangement 12 then draws current to achieve an impedance of, for instance, 400 ohms, and, according to step 78, the power consumed by the LED driver arrangement 12 is calculated in watts, as P2, for instance. According to step 80, powers P1 and P2 are compared to determine the ballast type (i.e., two-wire or three-wire magnetic ballasts). A three-wire magnetic ballast is indicated if power P2 is greater than power P1; and a two-wire magnetic ballast is indicated if power P1 is greater than power P2. Following step 80, the logic and electrical condition control circuit 36 (FIG. 1) then carries out step 66 of FIG. 5, shown in phantom.

The various measurements made in connection with the flow charts of FIGS. 5 and 6 are preferably made multiple times (e.g., 10 times), so that spurious values that may arise due to noise, for instance, can be discarded.

Although the flow charts of FIGS. 5 and 6 describe discrimination among three choices of ballast condition (i.e., no magnetic ballast, or a two- or three-wire magnetic ballast), it would be a matter of routine skill in the art based on the present specification to discriminate a three-wire magnetic ballast from one or more other ballast conditions. The one or more other ballast conditions could be any one or a combination of a no-ballast condition, a two-wire magnetic ballast condition, and a NEALS U.S. Navy Military No. M16377/77-001 ballast (a type of electronic ballast), by way of example.

The following is a list of reference numerals and associated parts as used in this specification and drawings:

| Reference Numeral | Part |
|---|---|
| 10 | LED lamp system |
| 12 | LED driver arrangement |
| 14 | LED board |
| 16 | Fluorescent lamp fixture |
| 18 | Fluorescent lamp fixture |
| 20 | AC main |
| 22 | AC main |
| 28 | Full-wave rectifier and filter |
| 30 | Power Factor Corrected (PFC) driver circuit |
| 33 | Electrical condition sensor |
| 36 | Logic and electrical condition control circuit |
| 40 | Fluorescent lamp |
| 45 | Graph |
| 54 | Step |
| 56 | Step |
| 58 | Step |
| 60 | Step |
| 64 | Step |
| 66 | Step |
| 70 | Step |
| 73 | Step |
| 76 | Step |
| 78 | Step |
| 80 | Step |

The foregoing describes an LED lamp system designed to fit into a fluorescent lamp fixture, and which increases the current supplied to one or more LED lamps, upon determination that the fluorescent lamp fixture contains a three-wire magnetic ballast, so that the power factor presented to AC mains is at least about 0.8.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. An LED lamp system designed to fit into a fluorescent lamp fixture and to utilize a fluorescent lamp power supply contained in the fluorescent lamp fixture; the fluorescent lamp power supply receiving power from AC mains and having a ballast condition that can be at least either a two-wire magnetic ballast or a three-wire magnetic ballast; the LED lamp system including an LED driver arrangement which comprises:

a) a power factor corrected driver circuit for presenting a power factor to the AC mains of at least about 0.8 when either a two-wire magnetic ballast or a three-wire magnetic ballast is present in the fluorescent lamp power supply; and b) a logic and electrical condition current control circuit, responsive to the presence of a three-wire magnetic ballast in the fluorescent lamp power supply for increasing an LED operating current above a nominal rated LED operating current and to a level sufficient to achieve power factor of the LED driver arrangement of at least about 0.8;

c) wherein the two-wire magnetic ballast is configured so that:

i) first and second conductors from a power source applying a potential therebetween are respectively coupled directly to a first end of said LED lamp system and to a first terminal of the two-wire magnetic ballast;

ii) said LED lamp system receives power from said first conductor and from a third conductor connected between a second terminal of the two-wire magnetic ballast and a second end of said LED system; and iii) said lamp system has a power factor greater than 0.8 when operated from a two-wire magnetic ballast; and d) wherein the three-wire magnetic ballast is configured so that:

i) first and second conductors from a power source applying a voltage potential therebetween are respectively coupled directly to two terminals of the three-wire magnetic ballast;

ii) said LED lamp system receives power from said first conductor at a first end of said LED lamp system and from a third conductor at a second end of said LED lamp system connected to a further terminal of the three-wire magnetic ballast;

iii) when powering a fluorescent lamp, said three-wire ballast attains a power factor of greater than 0.8; and iv) said lamp system has a power factor below 0.8 when the LED operating current is at the nominal rated LED operating current.

2. The LED lamp system of claim 1, wherein the current supplied to the LED driver arrangement is greater than 200 milliamps.

3. The LED lamp system of claim 1, wherein the current supplied to the LED driver arrangement is within about five percent of 270 ma.

4. The LED lamp system of claim 1, wherein the power factor presented to the AC mains with the three-wire ballast is at least about 0.9.

5. The LED lamp system of claim 1, wherein the power factor presented to the AC mains with the three-wire ballast at least about 0.95.

6. The LED lamp system of claim 1, wherein the power factor presented to the AC mains with the three-wire ballast is at least 0.99.

7. The LED lamp system of claim 1, wherein the LED driver arrangement is electrically connected between the fluorescent lamp power supply and LEDs of the LED lamp system and is separate from the fluorescent lamp fixture.

8. The LED lamp system of claim [7] *1*, wherein said logic and electrical condition current control circuit is configured:

a) to cause the LED driver arrangement to achieve a first impedance by selection of level of current drawn by the LED driver from the fluorescent lamp power supply;

b) to determine a first power level used by the LED driver arrangement when the LED driver is at said first impedance;

c) to cause the LED driver arrangement to thereafter achieve a second impedance, greater than the first impedance, by selection of the level of current drawn by the LED driver from the fluorescent lamp power supply; and d) to determine a second power level used by the LED driver arrangement when the LED driver is at said second impedance; and e) a three-wire magnetic ballast being indicated if the second power level exceeds the first power level, and a two-wire magnetic ballast being indicated if the first power level exceeds the second power level.

9. The LED lamp system of claim 1, wherein the ballast condition is absence of a magnetic ballast.

10. The LED lamp system of claim 1, wherein the ballast condition is a NEALS U.S. Navy Military No. M16377/77-001 ballast.

* * * * *